US009583975B2

(12) United States Patent
Talmola et al.

(10) Patent No.: US 9,583,975 B2
(45) Date of Patent: Feb. 28, 2017

(54) CHARGING AND AUDIO USAGE

(71) Applicant: Nokia Technologies Oy, Espoo (FI)

(72) Inventors: Pekka Heikki Kalervo Talmola, Turku (FI); Juha Reinhold Backman, Espoo (FI); Pekka Eerikki Leinonen, Turku (FI); Kai Allan Inha, Järvenpää (FI); Timo Tapani Toivola, Turku (FI); Timo Juhani Toivanen, Mäntsälä (FI)

(73) Assignee: Nokia Technologies Oy, Espoo (FI)

( * ) Notice: Subject to any disclaimer, the term of this patent is extended or adjusted under 35 U.S.C. 154(b) by 489 days.

(21) Appl. No.: 14/175,867

(22) Filed: Feb. 7, 2014

(65) Prior Publication Data
US 2015/0229161 A1 Aug. 13, 2015

(51) Int. Cl.
H02J 1/10 (2006.01)
H02J 9/06 (2006.01)
(Continued)

(52) U.S. Cl.
CPC ............ *H02J 9/061* (2013.01); *G06F 13/385* (2013.01); *H02J 1/08* (2013.01); *H02J 7/0072* (2013.01);
(Continued)

(58) Field of Classification Search
CPC .. H02J 7/0072; H02J 9/061; H02J 2007/0062; H02J 1/08; H02J 7/345; Y10T 307/344; G06F 1/266; G06F 13/385
(Continued)

(56) References Cited

U.S. PATENT DOCUMENTS

2008/0180874 A1* 7/2008 Gauger ................. H02J 7/0055
361/235
2010/0169534 A1 7/2010 Saarinen et al.
(Continued)

FOREIGN PATENT DOCUMENTS

JP 2007-282316 A 10/2007
JP 2013-516694 A 5/2013
(Continued)

OTHER PUBLICATIONS

Extended European Search Report received for corresponding European Patent Application No. 15152426.1, dated Jul. 13, 2015, 8 pages.
(Continued)

*Primary Examiner* — Jared Fureman
*Assistant Examiner* — Duc M Pham
(74) *Attorney, Agent, or Firm* — Harrington & Smith

(57) ABSTRACT

Methods and apparatus, including computer program products, are provided for charging and audio usage. In one aspect there is provided a method, which may include detecting, by an accessory including a first connector and a second connector configured to enable coupling to a user equipment, a charger being coupled to the first connector; sending, based on at least the detected charger, an indication to the user equipment to change to a power receive mode; detecting, by the accessory, the change to the power receive mode; and allowing, based on at least the detected change, power to flow from the first connector to the second connector. Related systems, apparatus, and articles of manufacture are also disclosed.

19 Claims, 8 Drawing Sheets

(51) Int. Cl.
*G06F 13/38* (2006.01)
*H02J 1/08* (2006.01)
*G06F 1/26* (2006.01)
*H02J 7/00* (2006.01)
*H02J 7/34* (2006.01)

(52) U.S. Cl.
CPC .............. *G06F 1/266* (2013.01); *H02J 1/108* (2013.01); *H02J 7/0004* (2013.01); *H02J 7/0036* (2013.01); *H02J 7/345* (2013.01); *H02J 2007/0062* (2013.01); *Y10T 307/344* (2015.04); *Y10T 307/406* (2015.04)

(58) Field of Classification Search
USPC .......................................................... 307/23
See application file for complete search history.

(56) References Cited

U.S. PATENT DOCUMENTS

| | | |
|---|---|---|
| 2011/0167281 A1 | 7/2011 | Rathi et al. |
| 2012/0242282 A1 | 9/2012 | Wada et al. |
| 2012/0271979 A1 | 10/2012 | Considine et al. |
| 2014/0270234 A1* | 9/2014 | Beal ................ H04R 1/1025 381/74 |
| 2015/0123620 A1* | 5/2015 | Nowak ................ H02J 7/0054 320/137 |

FOREIGN PATENT DOCUMENTS

| | | |
|---|---|---|
| WO | 2008/068552 A1 | 6/2008 |
| WO | 2011/125214 A1 | 10/2011 |

OTHER PUBLICATIONS

"4:1 Micro USB Switch With Accessory Detection and OVP", LC824204-13YB, Ver. 1.0, Oct. 2013, pp. 1-14.
"Battery Charging Specification", Revision 1.2, Dec. 7, 2010, 72 pages.
"Universal Serial Bus 3.1 Specification", Revision 1.0, Jul. 26, 2013, 631 pages.
"Universal Serial Bus 3.0 Specification", Revision 1.0, Nov. 12, 2008, 482 pages.
Office action received for corresponding Japanese Patent Application No. 2015-021099, dated Mar. 1, 2016, 4 pages of office action and 8 pages of office action translation available.
Final Office action received for corresponding Japanese Patent Application No. 2015-021099, dated Jun. 21, 2016, 1 pages of office action and 5 pages of office action translation available.

* cited by examiner

400

```
┌─────────────────────────────────────────┐
│  ACCESSORY DETECTS A LOSS OF POWER AT   │
│  VBUS AND/OR A DECOUPLING OF CHARGER 410│
└─────────────────────────────────────────┘
                    │
┌─────────────────────────────────────────┐
│  ACCESSORY, IN RESPONSE TO THE DETECTION│
│  AT 410, DISABLES CONNECTION TO CHARGER │
│     AND/OR INFORMS UE TO CHANGE INTO A  │
│       POWER SOURCE MODE  420            │
└─────────────────────────────────────────┘
```

CHARGING AND AUDIO USAGE

FIELD

The subject matter described herein relates to wireless devices.

BACKGROUND

Physical connectors, such as the connector used with the Universal Serial Bus (USB), can be used to couple devices. USB standards define physical and electrical aspects of USB. Examples of those standards include Universal Serial Bus 3.1 Specification and Universal Serial Bus 3.0 Specification, as well as any additions, revisions, and updates thereto.

SUMMARY

Methods and apparatus, including computer program products, are provided for charging and audio usage.

In some example embodiments, there is provided a method. The method may include detecting, by an accessory including a first connector and a second connector configured to enable coupling to a user equipment, a charger being coupled to the first connector; sending, based on at least the detected charger, an indication to the user equipment to change to a power receive mode; detecting, by the accessory, the change to the power receive mode; and allowing, based on at least the detected change, power to flow from the first connector to the second connector.

In some variations, one or more of the features disclosed herein including the following features can optionally be included in any feasible combination. The indication may include a message sent by the accessory via a digital interface of the accessory. The detected power receive mode change may include receiving another message from the digital interface of the accessory, wherein the other message indicates a change in power mode. The allowing may further include closing a switch to allow the power to flow from the first connector coupled to the charger to the second connector coupled to the user equipment. The accessory may detect a loss of power provided by the charger. Another indication to the user equipment may be sent to change to a power source mode based on at least the detected power loss. The switch may be opened to disable a connection to the charger and to allow the user equipment to supply power to the accessory via the second connector. The at least one diode may be coupled to the second connector and the switch to prevent a current flow from a capacitor to the second connector and the coupled user equipment, wherein the capacitor may provide a momentary source of power to the accessory when the loss of power from the charger occurs. The accessory may include a headset. The first connector and the second connector may include a universal serial bus connector, a Micro-B connector, a Type C connector, a dedicated charging connector, or a combination thereof.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIGS. 3 and 4 depict examples of processes for use at a headset including two connectors, in accordance with some example embodiments.

Figure 1:
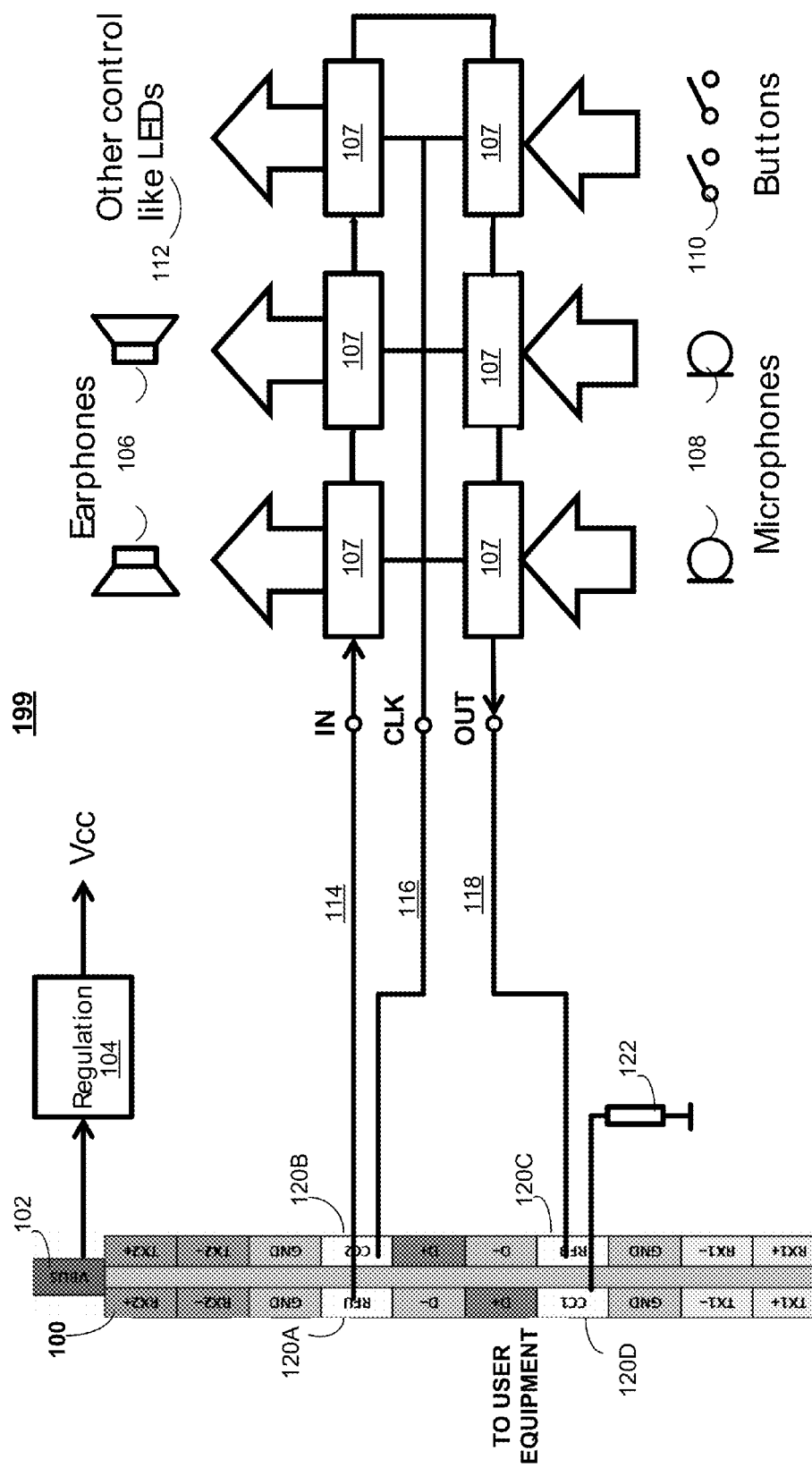
FIG. 1 depicts an example of an accessory, such as a headset in accordance with some example embodiments.

Like labels are used to refer to same or similar items in the drawings.

DETAILED DESCRIPTION

FIG. 1 depicts an example of an accessory device, such as an audio headset device 199. The headset 199 may include a data connector 100, in accordance with some example embodiments. The connector 100 may, in some example embodiments, include a single, small-sized connector, such as a universal serial bus (USB) connector configured in accordance with USB 3.0, USB 3.1, and any subsequent revisions and updates thereto, that may have a symmetrical design which can be swapped, so that an end-user does not need to be concerned with whether the connector is connected to a host device or a slave device or the way the connector plug is inserted into a receptacle. For example, USB connector 100 may be a plug at a headset device 199. When headset 199 couples USB connector 100 into a user equipment, the headset 199 may obtain power and/or audio from the user equipment via the USB connector 100.

The headset 199 may include a voltage bus 102 and a power regulator 104 for regulating supplied power (labeled Vcc). The headset 199 may include one or more user interfaces, such as one or more speakers/earphones 106, one or more microphones 108, one or more switches (or control mechanisms), light emitting diodes 112, and the like coupled to audio and control circuitry 107. The user interfaces may receive via audio and control circuitry 107 a signal input 114 (for example, an audio signal, control, and the like) and a clock 116. The user interfaces may also provide an output signal 118 (for example, audio out, control, and the like). The signal input 114, clock 116, and output signal 118 may be coupled to connector 100. For example, signal input 114 may couple to pin 120A (labeled RFU), clock signal 116 may couple to a configuration channel (CC2) pin 120B, and output signal 118 may couple to pin 120C (labeled RFU), although other connection configurations may be used as well. In the example of FIG. 1, USB connector 100 may represent a USB Type C plug, in which RFU pins 120A and 120B may be reserved for future use. FIG. 1 also shows a load resistor 122 coupled to configuration channel pin 120D.

In the example of FIG. 1, headset 199 may be used to listen and/or speak during a call at a user equipment. However, if the user equipment's USB connector receptacle is coupled to headset 199 via plug connector 100, the user equipment cannot use its connector receptacle for charging while the headset 199 is coupled to that connector receptacle. For example, if a user is on a long call and drains the battery power of the user equipment, the USB connector plug 100 may need to be disconnected from the user equipment to allow a charger to be plugged into the user equipment's connector receptacle.

In some example embodiments, the subject matter disclosed herein may allow a single connector to be used to provide both audio and charging, in accordance with some example embodiments.

Figure 2A:
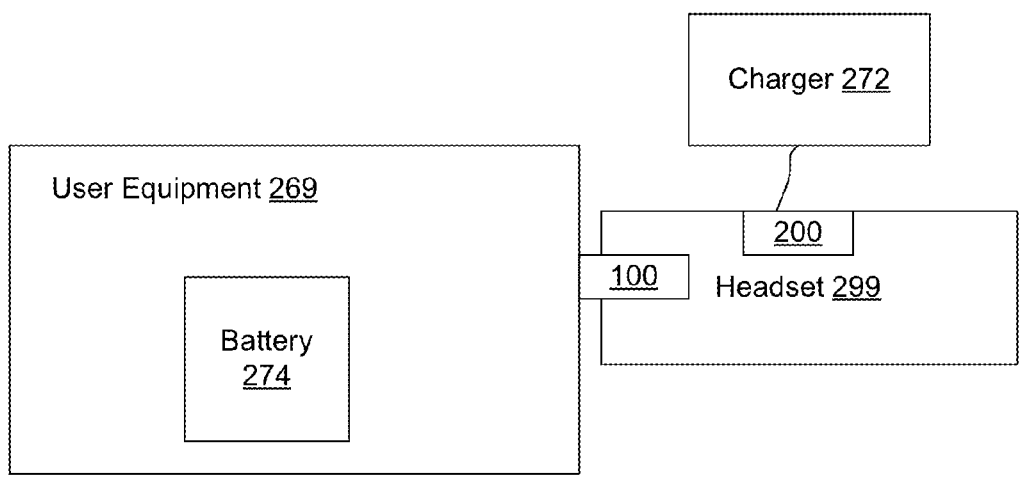
FIG. 2A depicts an example of a system including a headset with two connectors, in accordance with some example embodiments.

FIG. 2A depicts a system including a device, such as a headset 299 including two connectors, such as USB connectors 100 and 200, in accordance with some example embodiments. The first USB connector 100 may be a USB plug, which may be inserted into user equipment 269, such as a cell phone, a smartphone, and/or any other device. The second USB connector 200 may be a USB receptacle into which a charger 272 may be connected. In some example embodiments, connector receptacle 200 (where the charger 272's connector plug is inserted) may be placed at headset 299 to allow headset 299 to remain connected during for example, a phone call, enabling thus the charger 272 to charge the battery 274 at user equipment 269.

In some example embodiments, headset 299 may detect when charger 272 couples to USB receptacle 200 at headset 299. The headset 299 may, in some example embodiments, inform user equipment 269 that charging is available via headset 299, and may connect the charger 272 to user equipment 269 to provide power to for example charge battery 274. For example, the accessory, such as headset 299, may send a message via a digital interface to the user equipment 269. This message may indicate a power mode for the user equipment. For example, this message may indicate whether user equipment 269 should be a power sink, allowing charger 272 to provide power and/or allowing charging of battery 274 at user equipment 269. Alternatively or additionally, the message may indicate whether the user equipment 269 should be a power source to the accessory/headset 299. The message may comprise one or more bits, which when received by the user equipment 269 indicate a power mode. Moreover, the message may be multiplexed with other traffic, such as audio data and the like, carried by the digital interface via lines 114-118.

Figure 2B:
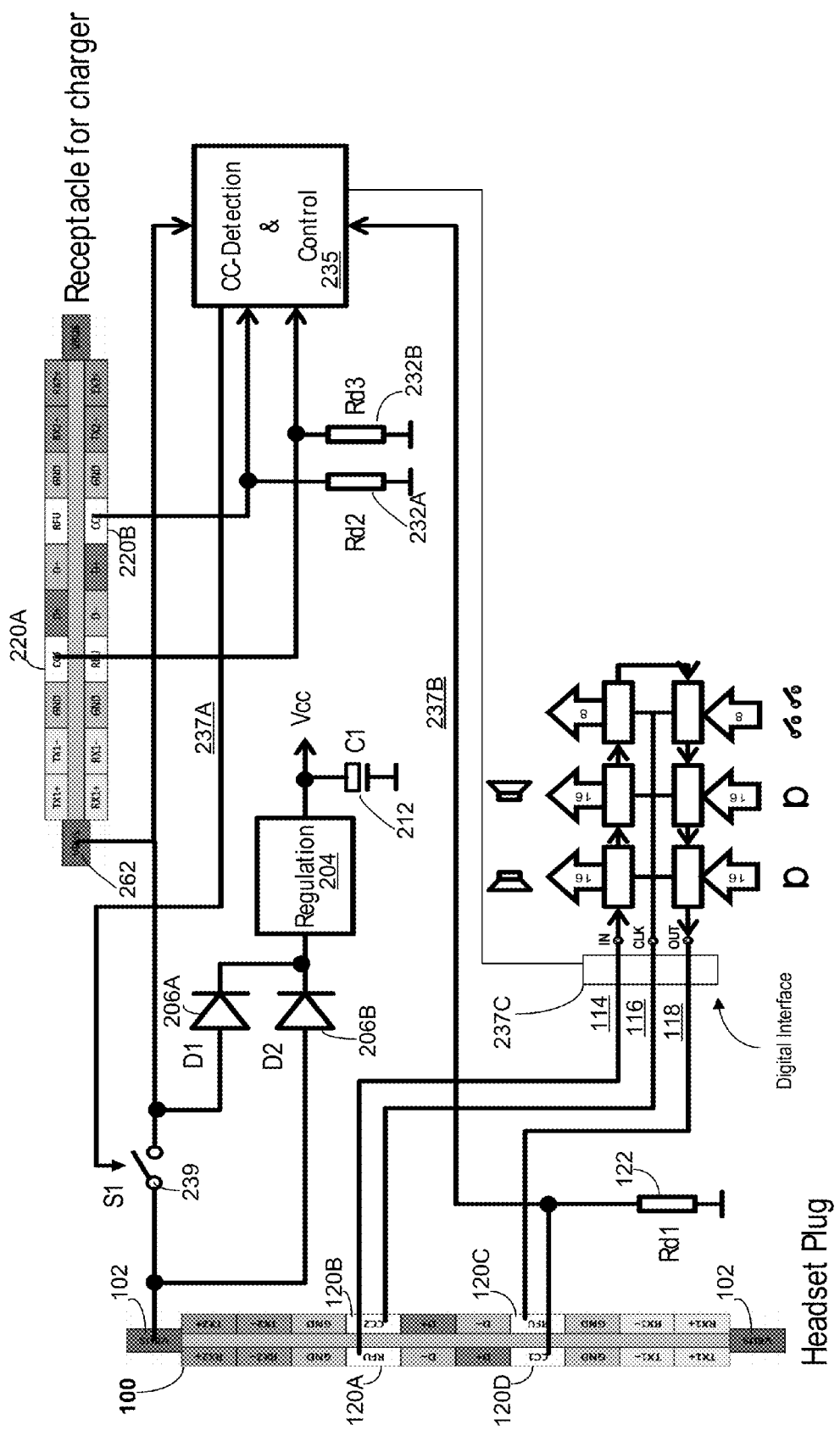
FIG. 2B depicts an example of a headset including two connectors, in accordance with some example embodiments.

FIG. 2B depicts headset device 299, in accordance with some example embodiments. The description of FIG. 2B also refers to FIG. 2A.

When headset 299 including headset USB plug 100 is coupled to for example a user equipment, a pull down resistor (labeled Rd1) 122 pulls the phone configuration channel (CC) line 120D lower/down (which is coupled to controller circuitry 235 via 237B). The pull down allows the coupled user equipment to detect the pull down and, as such, a coupled slave accessory (which in this case is headset 299). When the user equipment detects headset 299, the user equipment may apply power to a voltage bus (VBUS) at the user equipment. The user equipment may also initiate a handshaking via digital interface (for example, a one or more lines including lines 114-118) by clocking out an identifier (id)-word from headset 299. If headset 299 is of a certain or known type to which the user equipment can communicate, the user equipment may determine from the id-word the type of headset 299 being coupled. The headset 299 may then receive power from the user equipment's VBUS coupled to connector 100 and VBUS 102. In the case of USB, the initial VBUS supply voltage may be 3 volts, but headset 299 may need to accommodate higher voltages as well from time to time, so regulator 204 may be used to regulate power received via the VBUS.

The VBUS at the user equipment may thus provide power to VBUS 102 at the headset 199. This power (for example, current and the like) may flow from VBUS 102 via diode D2 206B to regulator 204, which as noted regulates the output voltage, $V_{CC}$, to a suitable level. The output voltage may be used to power headset 299 and/or charge capacitor 212.

When the user equipment's battery 274 needs charging during a call, charger 272 may be plugged into the USB receptacle 200 at headset 299, rather than disconnect the headset from the user equipment. In some example embodiments, pull down resistors Rd2 232A and/or Rd3 232B may pull one or more configuration channel lines 220A-B (CC1 and/or CC2). This pull down may be detected by charger 272, which then activates the VBUS at charger 272, and charger 272 may then provide for example 5 volts from the charger 272 to connector 200/VBUS 262, although other voltage values may be provided as well.

In some example embodiments, the charger 272 may have an always on (for example, when connected to an alternating current outlet) VBUS, in which case the pull down resistors 232A-B may not be needed.

Controller circuitry 235 may detect when charger 272 couples to connector 200 (and VBUS 262) to ensure charger 272 is coupled and supplying power to VBUS 262. The VBUS 262 (powered by charger 272 at 5 volts in this example) may power headset 299 via diode D1 206A, while diode D2 206B may prevent current flowing to user equipment 269 while switch S1 is open. Headset 299 including controller 235 may inform user equipment 274 via digital interface 237C (for example, lines 114-118) and connector 100 that a charger has been connected and that user equipment 269 should change mode from a power source mode (which supplies power to headset 299) to a power sink mode (which receives power from charger 272). After the power sink mode change, controller 235 may signal 237A switch S1 239 to close, so that power from charger 272 and VBUS 262 flows to connector 100/VBUS 102 and battery 274 at user equipment 269.

If charger 272 is removed from receptacle 200 (or otherwise stops providing power), the power at VBUS 262 ceases. This loss of power may be detected by controller circuitry 235. At this instant headset 299 is not being supplied by any external power source, so headset 299 may rely on energy stored in capacitor C1 212. In some example embodiments, when charger 272 is disconnected from headset 299, headset 299 may, in some example embodiments, be powered by capacitor 212 for a brief period while headset 299 informs user equipment 269 that charging is no longer available and, as such, user equipment 269 should supply power to headset 299. The controller circuitry 235 may, in response to the detection of loss of charger power, also initiate signaling via digital interface 114-118 to user equipment 269 to inform user equipment 269 that the charger 272 has stopped providing power and/or that user equipment 269 should resume a power source mode to supply power via connector 100/VBUS 102 to headset 299 in order to enable powered operations via the user equipment.

Although FIG. 2B depicts connector 200 as the same type of connector as connector 100, the connectors 100 and 200 may be of different types. Alternatively or additionally, headset 299 may include a Micro-B connector to allow chargers with a Micro-B connector at 200 to couple to headset 299. When this is the case, headset 299 may detect the Micro-B charger, inform the user equipment, change modes, and the like as noted above (and herein). Although some of the examples disclosed herein refer to USB connectors and Micro-B connectors, the references to USB and Micro-B are merely examples as other types of connectors may be used as well. Examples include dedicated charging connectors, such as a receptacle for a 2 millimeter charging plug. Furthermore, although USB 3.0 and USB 3.1 are described, other versions of USB may be used as well. Although the previous example as well as some of the examples described herein refer to the accessory as a headset, other types of accessories may be used as well. Moreover, although some of the examples described herein refer to the user equipment as a phone, other types of device may be used to couple to the accessory as well.

Figure 3:
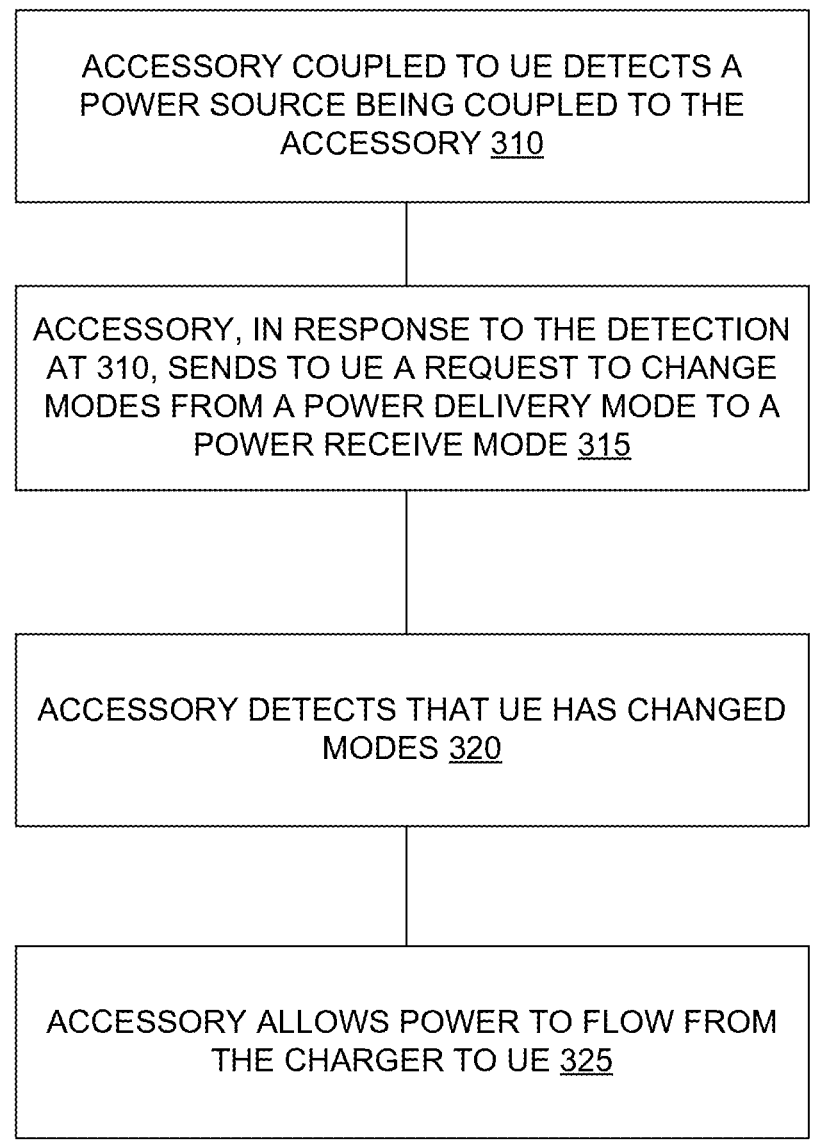

FIG. 3 depicts an example process 300 for audio and charging operation, in accordance with some example embodiments.

At 310, an accessory coupled to a user equipment may detect a power source being coupled to the accessory, in accordance with some example embodiments. For example, control circuitry 235 may detect charger 272 coupling to connector 200 by the increase in power on the VBUS 262 and/or a change at CC pin 220A (and/or CC pin 220B) indicative of current flow.

At 315, the accessory may, in response to the detection at 310, send to the user equipment a request to change modes from a power delivery mode to a power receive mode, in accordance with some example embodiments. When headset device 299 detects a power source at connector 200 (for example, energized charger 272), headset 299 may inform coupled user equipment 269 via a digital interface 237C (for example data/control lines 114-118) to stop supplying power to headset 299 and instead enter a power receive mode to allow charger 272 to provide power to user equipment 269 (for example, to allow charging of battery 274). Once the power mode change occurs as noted above, the user equipment may receive power from charger 272 via headset 299.

At 320, the accessory may detect that the user equipment has changed power mode form a power source to a power sink. For example, accessory may receive a message from the user equipment, which indicates that user equipment has changed power mode from a power source to a power sink. The message may be received via the digital interface of connector 100, for example via data/control lines 114-118.

Alternatively or additionally, the accessory may detect, at 320, that the user equipment stops power delivery, in accordance with some example embodiments. For example, control circuitry 235 may detect the loss of power at VBUS 102. As noted, headset 299 may rely on energy stored in capacitor C1 212 if it is not being supplied power by any external power source.

At 325, the accessory may allow power to flow from the charger to user equipment, in accordance with some example embodiments. For example, controller 235 may, when it detects that user equipment 269 has changed power mode, close switch S1 239 to enable power/current from charger 272 to flow from headset 299 including connector 200/VBUS 262 to connector 100 (which is coupled to user equipment 269).

FIG. 4 depicts another example process 400 for audio and charging operation, in accordance with some example embodiments.

At 410, the accessory may detect a loss of power at VBUS 262 and/or a decoupling of charger 272 providing that power, in accordance with some example embodiments. For example, when charger 272 is disconnected or de-energized, controller circuitry 235 may detect the loss of power at VBUS 262 and/or detect that CC pins 220A-B are no longer conducting. While no external power source supplies power to headset 299, capacitor C1 212 may momentarily provide power to headset 299 temporarily until an external source (for example, user equipment 269 and/or charger 272) couple and provide power.

At 420, accessory may, in response to the detection at 410, disable connection to charger and/or inform the user equipment to change into a power source mode, in accordance with some example embodiments. For example, controller 235 may open switch S1 239 to disable the power flow from connector 200 (which is coupled to charger 272) to connector 100 (which is coupled to the user equipment 269). The controller 235 may also send a request via digital interface 237C (for example, lines 114-116) via connector 100 to user equipment 269 to begin power delivery to VBUS 102. In response, the user equipment 269 may energize its VBUS coupled to connector 100/VBUS 102 to allow power to once again flow to headset 299.

Figure 5:
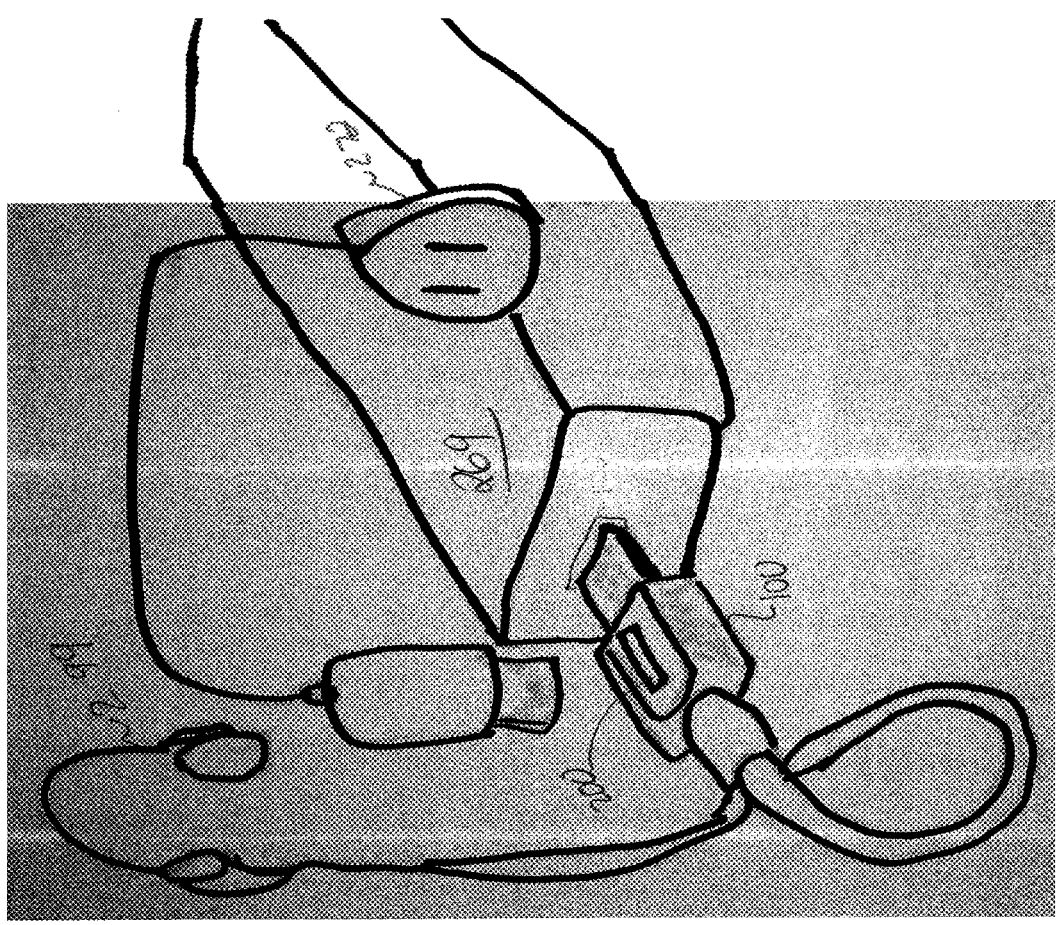
FIGS. 5 and 6 depict examples of configurations of the system of FIG. 2A, in accordance with some example embodiments.
Figure 6:
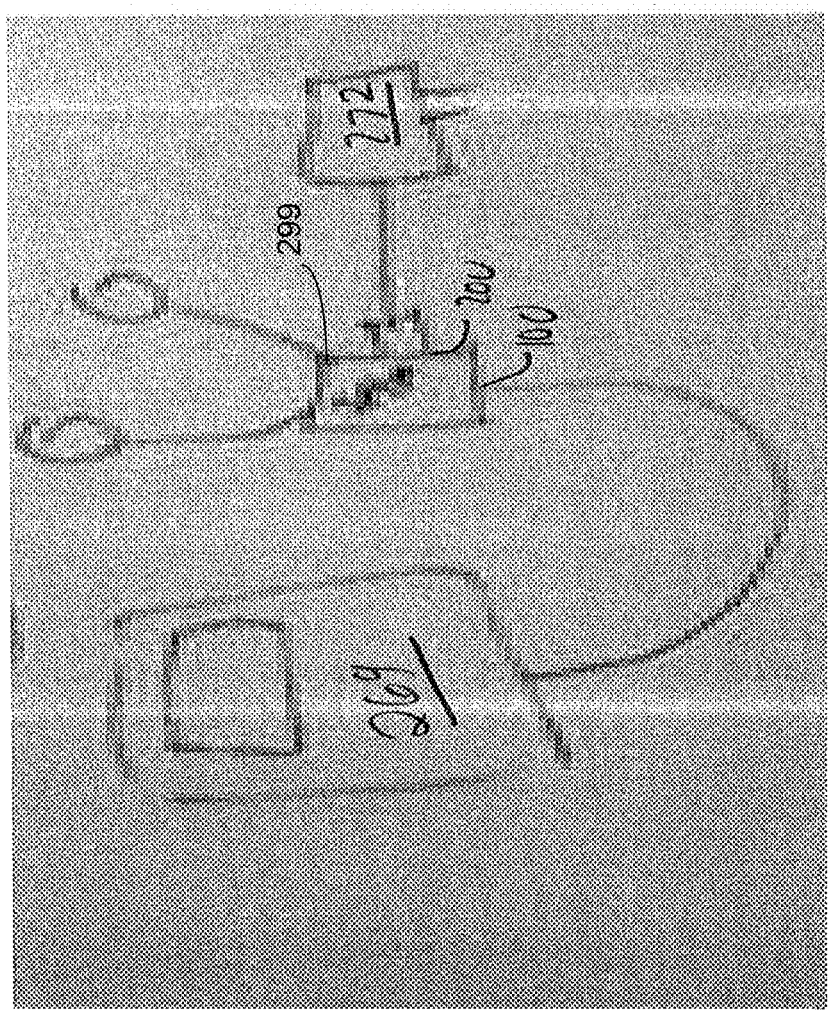

FIGS. 5 and 6 depict example implementations of headset 299 including connectors 100 and 200, although other configurations may be implemented as well. FIG. 5 depicts connector 200 placed on the plug portion of connector 100. FIG. 6 depicts connector 200 at another location, namely at the headset 299 itself, although other locations for connector 200 may be used as well.

Figure 7:
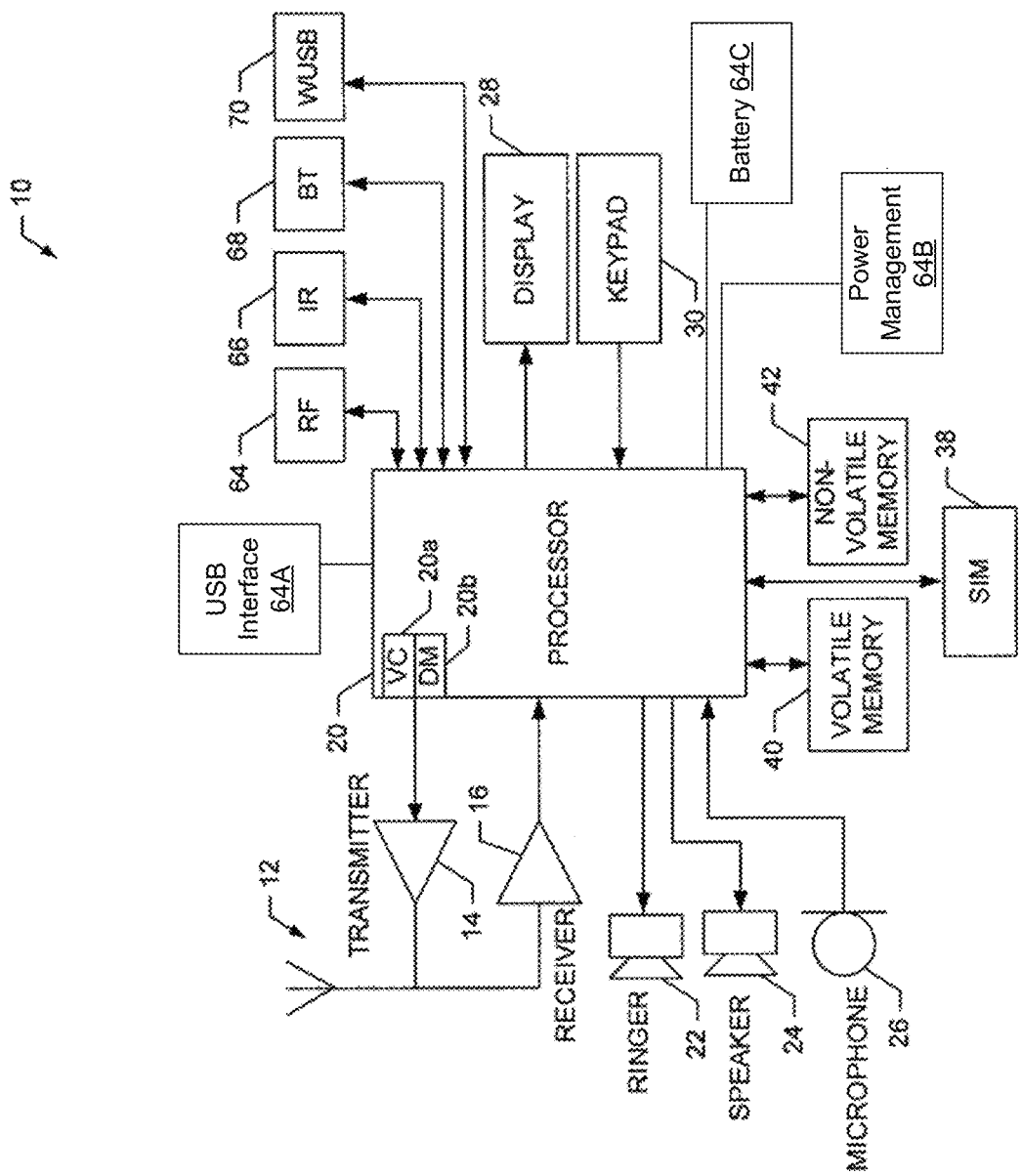
FIG. 7 depicts an example of a user equipment, in accordance with some example embodiments.

FIG. 7 illustrates a block diagram of an apparatus 10, in accordance with some example embodiments. For example, apparatus 10 may comprise a user equipment, such as a smart phone, a smart object, a mobile station, a mobile unit, a subscriber station, a wireless terminal, a tablet, a wireless plug-in accessory, a wireless sensor, a headset, or any other wireless device. The apparatus 10 may correspond to for example the Bluetooth device having the touch screen sensor and/or a Bluetooth device being detected by the touch screen sensor.

In some example embodiments, the apparatus 10 may include USB interface 64A, power management circuitry 64B, and/or a battery 64C.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed with respect to processes 300 and/and 400 including receiving messages from the accessory via a digital interface to change between power delivery and receive modes, changing power modes, and the like. The memories may comprise an identifier, such as an international mobile equipment identification (IMEI) code, capable of uniquely identifying apparatus 10. In the example embodiment, the processor 20 may be configured using computer code stored at memory 40 and/or 42 provide to user equipment processes 300 and/and 400 including receiving messages from the accessory, changing power modes, and the like. The accessory, such as headset 299, may also include computer code stored at a memory to provide to headset related aspects of processes 300 and/and 400 and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is power and audio usage via a single connector.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed is:

1. A method comprising:
    detecting, by an accessory including a first connector and a second connector configured to enable coupling to a user equipment, a charger being coupled to the first connector;
    sending, based on at least the detected charger, an indication to the user equipment to change to a power receive mode;
    detecting, by the accessory, the change to the power receive mode;
    allowing, based on at least the detected change, power to flow from the first connector to the second connector;
    detecting a loss of power provided by the charger; and
    based on the detecting, providing a momentary source of power to the accessory from a capacitor power to the accessory when the loss of power occurs.

2. The method of claim 1, wherein the indication comprises a message sent by the accessory via a digital interface of the accessory.

3. The method of claim 2, wherein the detecting the change to the power receive mode comprises receiving another message from the digital interface of the accessory, and wherein the other message indicates a change in power mode.

4. The method of claim 1, wherein the allowing further comprises: closing a switch to allow the power to flow from the first connector coupled to the charger to the second connector coupled to the user equipment.

5. The method of claim 1 further comprising: sending, based on at least the detected power loss, another indication to the user equipment to change to a power source mode.

6. The method of claim 1 further comprising: opening the switch to disable a connection to the charger and to allow the user equipment to supply power to the accessory via the second connector.

7. The method of claim 6, wherein at least one diode is coupled to the second connector and the switch to prevent a current flow from a capacitor to the second connector and the coupled user equipment, wherein the capacitor provides the momentary source of power to the accessory when the loss of power from the charger occurs.

8. The method of claim 1, wherein the accessory comprises a headset.

9. The method of claim 1, wherein the first connector and the second connector comprise a universal serial bus connector, a Micro-B connector, a Type C connector, a dedicated charging connector, or a combination thereof.

10. An apparatus, comprising:
    at least one processor; and
    at least one memory including computer program code, the at least one memory and the computer program code configured to, with the at least one processor, cause the apparatus to perform at least the following
    detect, by the apparatus including a first connector and a second connector configured to enable coupling to a user equipment, a charger being coupled to the first connector;
    send, based on at least the detected charger, an indication to the user equipment to change to a power receive mode;
    detect, by the apparatus, the change to the power receive mode;
    allow, based on at least the detected change, power to flow from the first connector to the second connector;
    detect a loss of power provided by the charger; and
    based on the detecting, provide a momentary source of power to the accessory from a capacitor power to the accessory when the loss of power occurs.

11. The apparatus of claim 10, wherein the indication comprises a message sent by the apparatus via a digital interface of the apparatus.

12. The apparatus of claim 11, wherein the apparatus is further configured to at least receive another message from the digital interface of the apparatus, and wherein the other message indicates a change in power mode.

13. The apparatus of claim 10, wherein the apparatus is further configured to at least close a switch to allow the power to flow from the first connector coupled to the charger to the second connector coupled to the user equipment.

14. The apparatus of claim 10, wherein the apparatus is further configured to at least send, based on at least the detected power loss, another indication to the user equipment to change to a power source mode.

15. The apparatus of claim 10, wherein the apparatus is further configured to at least open the switch to disable a connection to the charger and to allow the user equipment to supply power to the apparatus via the second connector.

16. The apparatus of claim 15, wherein at least one diode is coupled to the second connector and the switch to prevent a current flow from a capacitor to the second connector and the coupled user equipment, wherein the capacitor provides the momentary source of power to the apparatus when the loss of power from the charger occurs.

17. The apparatus of claim 10, wherein the apparatus comprises a headset.

18. The apparatus of claim 10, wherein the first connector and the second connector comprise a universal serial bus connector, a Micro-B connector, a Type C connector, a dedicated charging connector, or a combination thereof.

19. A non-transitory computer readable storage medium including code which when executed by at least one processor causes operations comprising:

detecting, by an accessory including a first connector and a second connector configured to enable coupling to a user equipment, a charger being coupled to the first connector;

sending, based on at least the detected charger, an indication to the user equipment to change to a power receive mode;

detecting, by the accessory, the change to the power receive mode;

allowing, based on at least the detected change, power to flow from the first connector to the second connector;

detecting a loss of power provided by the charger; and based on the detecting, providing a momentary source of power to the accessory from a capacitor power to the accessory when the loss of power occurs.

\* \* \* \* \*